Patented Aug. 22, 1944

2,356,384

UNITED STATES PATENT OFFICE 2,356,384

TREATMENT OF RESIN OILS AND RESIN PRODUCT RESULTING THEREFROM

Edwin Louis Cline, Philadelphia, Pa., assignor, by mesne assignments, to Allied Chemical & Dye Corporation, a corporation of New York No Drawing. Application February 11, 1941, Serial No. 378,446

9 Claims. (Cl. 260—80)

This invention relates to a method of processing oils containing resinogenic constituents of the indene-styrene homolog type and to a new resin product obtained from such oils. The new resin product of this invention is a resin of the type catalytically produced in the process described in my co-pending application Serial No. 346,292, filed July 19, 1940.

Resinous products are produced by treating oils containing polymerizable substances such as indene, coumarone, styrene, their homologs and similar resin-forming substances to polymerize their resinogenic constituents. When dealing with crudes in which the major proportion of polymerizable constituents consists of substances boiling above styrene, e. g., indene and its homologs, styrene homologs, and coumarone, the polymerization is generally carried out with the aid of catalysts, such as sulfuric acid, in order to obtain a resin of suitable characteristics, e. g., of adequate hardness and proper melting point for the uses to which these resins are generally put, e. g., production of coating materials and flooring.

In order to improve the resin and give it suitable characteristics as above indicated, it has heretofore been proposed to subject the resin crude to various pretreatments, such as distillation or purification by chemical treatment, and various modifications of the polymerization operation have also been proposed; for example, control of process conditions such as temperature, concentration of polymerizables, or time of polymerization. However, it has not heretofore been found possible in production of resins of this type to process the resin crude so as to obtain a resin having favorable solubility characteristics; i. e., a resin that may be dissolved in both vegetable and mineral oils and is compatible with stearin pitch, and at the same time has a sufficiently high melting point and adequate hardness so that the product formed by blending the resin with stearin pitch is suitable for high quality tile production.

It is an object of this invention to provide a new method for improving the quality of resin obtainable from a resin crude of the indene-styrene homolog type.

It is a further object of this invention to provide a new resin product of the indene type which has properties making it particularly advantageous for mastic tile production.

I have discovered that when a resin oil containing substantial proportions of indene and homologs of styrene, particularly a resin oil in which at least 80% of the polymerizable constituents consist of indene and homologs of styrene, and in which indene comprises about 25% to 80%, preferably about 40% to 60%, of the polymerizable constituents and styrene homologs comprise about 20% to 75%, preferably about 40% to 60%, of the polymerizable constituents, is subjected to a preliminary heat polymerization treatment (whereby styrene and its homologs are preferentially polymerized) until indene constitutes 70% to 85%, preferably 75% to 80%, of the polymerizable bodies which have not undergone polymerization, and the heat polymer thus formed is separated from the unpolymerized oil, a resin of greatly improved quality may be prepared by carrying out catalytic polymerization of the unpolymerized portion of the oil utilizing any well known catalyst, such, for example, as sulfuric acid, clay, metallic halides, hydrogen fluoride and aryl sulfonic acids. The catalytic polymerization is preferably carried out with a clay catalyst or sulfuric acid catalyst.

I have further produced, in accordance with my invention, a new resin product of the indene type which has a melting point in the range 125° to 145° C. and is compatible with stearin pitch (of cottonseed origin, melting point (R. & B.) of 110° F.) to form a composition consisting of 60 parts resin to 40 parts pitch, which composition is homogeneous in structure, breaks with a bright, sharp fracture, and has an indentation not over 0.150 inch in ten minutes at 77° F. when tested with the McBurney-Bowen indentation tester using a one-quarter inch indenting point. My new resin product may be further characterized by its good color, i. e., a color of less than C-3½ on the standard resin-color scale hereinafter described, by its high vegetable oil solubility, as shown by the fact that a rapeseed oil solution does not cloud at −10° C. when tested in accordance with the standard rapeseed oil test described below, and by its high petroleum oil solubility, as shown by the fact that a Stoddard solvent solution does not cloud at 0° C. when tested in accordance with the standard Stoddard solvent test described below.

My new product may be prepared by using a resin crude from a natural source, e. g., drip oil, coke oven distillate, water-gas light oil, cracked and re-formed petroleum oil, or similar resin crude, as more fully discussed below, in the process of my invention, and by carrying out the subsequent catalytic polymerization of the unpolymerized oil, following separation of the preliminary heat polymer, by means of a clay catalyst or sulfuric acid catalyst. The catalytically produced resin thus obtained is a new product having the properties described above. As indicated, the catalytically produced resin of my present invention is a specific form of the catalyst polymer described in my co-pending application Serial No. 346,292.

The resin scale of color referred to above is determined by mixing three stock solutions in the proportions indicated in the following table, thereby obtaining the colors indicated in this table; namely, stock solution "A" constituted of 40 cc. of 33.5% hydrochloric acid and 1560 cc. of water; stock solution "B" made by triturating 450 grams of C. P. ferric chloride ($FeCl_3.6H_2O$), 270 cc. of solution "A," and filtering, using the clear filtrate for stock solution "B"; and stock solution "C" made by triturating 60 grams of C. P. cobalt chloride ($CoCl_2.6H_2O$) and 60 cc. of solution "A" and filtering, using the filtrate for stock solution "C."

*Volumes in cubic centimeters*

| Color number | "A" | "B" | "C" | Water |
|---|---|---|---|---|
| C-½ | 125 | 0.5 | 0.50 |  |
| C-1 | 125 | 1.0 | 0.75 |  |
| C-1½ | 125 | 1.4 | 0.95 |  |
| C-2 | 125 | 2.0 | 1.25 |  |
| C-2½ | 125 | 2.8 | 1.60 |  |
| C-3 | 125 | 4.0 | 2.00 |  |
| C-3½ | 15 | 6.0 | 2.00 | 110 |
| C-4 | 15 | 8.0 | 2.00 | 110 |
| C-5 | 15 | 10.0 | 2.75 | 85 |
| C-6 | 10 | 20.0 | 5.00 | 90 |
| C-7 |  | 40.0 | 7.50 | 100 |
| C-8 |  | 65.0 | 5.00 | 50 |
| C-9 |  | 125.0 | 10.00 | 27.5 |
| C-10 |  | 125.0 | 10.00 |  |

The solutions should be mixed well and about 25 to 28 cc. of each of the above indicated mixtures placed in a 1 oz. test bottle, each bottle labeled with its number, and the bottles sealed with sealing wax to prevent evaporation of water and HCl.

To determine the color of a resin, a 2-gram sample thereof is dissolved in 25 cc. of benzol and the depth of the color of the resin solution thus produced is compared with the standard colors. If the sample lies between two consecutive numbers, its color is reported as the higher one.

The standard rapeseed oil solubility test referred to above is carried out as follows: 17.7 grams of resin and 18.2 grams of rapeseed oil are heated and held at a temperature of 140° to 150° C. until a clear solution is obtained. This solution is poured into a 20x175 mm. test tube to a depth of 6 cm. The solution is cooled to room temperature, the time noted, and after standing for one hour at room temperature the presence or absence of cloudiness in the solution is noted. If the solution remains clear, it is thereupon cooled to +10° C., kept at this temperature for one hour, and again examined for cloudiness. This procedure is repeated for the temperatures 0° C., —10° C. and —20° C. successively. The test is carried through in continuous fashion without delay or deviation from the specified periods of time.

The standard Stoddard solvent solubility test referred to above is carried out as follows: A 25% solution of the resin in Stoddard solvent (a petroleum distillate having a boiling range of approximately 150° to 200° C.) is prepared, is slowly chilled, and the temperature is observed at which a definite cloud first appears in the solution.

The resin oils which may be treated by the process of my invention, as above indicated, are resin oils containing substantial proportions of indene and homologs of styrene. These oils may also contain other polymerizable constituents such as styrene and small proportions of coumarone and indene homologs, but the nature and proportion of polymerizable constituents should be such that partial heat polymerization removes other constituents at a greater rate than indene so that the unpolymerized indene content may rise to at least 70% of the polymerizable constituents which have not undergone polymerization during the partial heat polymerization treatment. Preferably, styrene is substantially all separated before treating the oil in accordance with my invention, and my process is of particular importance for treating a resin oil in which indene comprises about 25% to 80%, preferably about 40% to 60%, of the polymerizable constituents and styrene homologs comprise about 20% to 75%, preferably about 40% to 60%, of the polymerizable constituents. In the resin oil to which my process is preferably applied, styrene should comprise not more than 5% of the polymerizables, coumarone not more than 5%, indene homologs not more than 10%, and the sum of the styrene homolog and indene contents should be at least 80% of the polymerizable constituents of the oil. My process is applicable to indene-styrene homolog crudes derived from the usual sources for crudes of this type; these sources include the crude "Hi-Flash" fractions obtained from drip oils (the oils condensed in the mains through which coal-distillation gas or water-gas is passed), and similar fractions derived, for example, from coke-oven distillates, water-gas light oil (a light oil distillate from carburetted water-gas wash oils) and the oils obtained by cracking and re-forming petroleum oil. The boiling range of such fractions is generally from about 150° to about 210° C. My process is of particular commercial significance for treating crudes of the type named which upon direct catalytic polymerization without partial heat polymerization pretreatment are found to give resins melting below 120° C.

The partial heat polymerization pretreatment of my invention may be carried out in various ways; for example, the resin oil may be refluxed at its boiling point or may be heated at temperatures above or below its boiling point, under pressure if desired. Air may be excluded during the heat polymerization of the oil, e. g., by use of a carbon dioxide atmosphere. The temperature of heat polymerization may advantageously be in the range about 150° to 200° C., preferably about 170° to 185° C. The rate of heat polymerization may vary with the temperature.

Before carrying out heat polymerization, the resin crude may be subjected to pretreatment to remove undesirable constituents; for example, the crude may be fractionated to decrease its styrene content or to remove low-boiling color-forming bodies, and when very impure crudes are employed the oil may be treated chemically (e. g. washed with dilute sulfuric acid) to remove impurities or substances which tend to retard polymerization.

In a preferred method of carrying out the pretreatment, a resin crude such as the fraction of drip oil, boiling from 150° to 205° C., is charged into a column still. If a particularly impure resin crude is employed, it may be pretreated by washing with dilute sulfuric acid or by distillation, or both, before charging it to the column still. When the oil contains a substantial proportion of styrene or other heat polymerizable material boiling below 150° C., the column still is preferably first operated under vacuum to remove the major part of such low-boiling material. The oil is then heated and distilled under atmospheric pressure to bleed out color-forming bodies and other undesirable low-boiling constituents of the oil and to initiate heat polymerization. After the greater part of the low-boiling constituents has been removed (usually amounting to about 5% of the oil when the above described fraction of drip oil is employed in the process of my invention), the column is blanked off and the heating of the oil in the still is continued to complete the heat polymerization.

As above indicated, heat polymerization is continued until the resin oil has reached an unpolymerized indene content of 70% to 85%, based on the weight of the unpolymerized polymerizable bodies remaining in the oil. Determination of when the oil has reached the desired indene concentration may be made by distilling a sample to separate the unpolymerized oil from the heat polymer and analyzing the distilled oil for indene, or by polymerizing the distilled sample with sulfuric acid or clay, recovering the catalyst polymer, and ascertaining whether it has attained the desired physical properties. Generally, as indicated in my application Serial No. 346,292, when treating an indene-styrene homolog crude from the usual sources, about 20% to 60%, and preferably about 40%, of the polymerizable constituents of the crude are polymerized during the preliminary heat treatment.

After the preliminary partial heat polymerization is completed, the unpolymerized material, an improved resin oil in which the predominant polymerizable constituent is indene, may be recovered by distillation. It is desirable to maintain the still temperature below about 190° C. during this distillation, which may be accomplished by employing vacuum or steam distillation, or both. The heat polymer, which is recovered as still residue, may itself be a resin of superior quality for many purposes as indicated in my application Serial No. 346,292.

The improved resin oil obtained after separation of the heat polymer is then subjected to catalytic polymerization to produce an indene-styrene homolog resin of improved qualities. The catalytic polymerization may be carried out by methods heretofore known in the art, for example, the methods described in Miller Patents 1,679,093, issued July 31, 1928, and 1,752,921, issued April 1, 1930. The resin oil which is to be subjected to catalytic polymerization is preferably diluted so that the concentration of polymerizables is less than 30%. After separation of the catalyst, the resin product may be recovered from the polymerized oil by the customary distillation procedure.

As above indicated, the catalytic polymerization is preferably carried out with clay or sulfuric acid as the catalyst, whereby there may be produced the new resin product of my invention described above. A natural or treated clay (e. g., Florida fuller's earth) may be employed as catalyst; my preferred clay catalyst is a natural clay which has been activated by treatment with an acid such as sulfuric acid. The clay polymerization is preferably carried out by agitating the refined naphtha at 90° to 100° C. for 3 to 6 hours with 4% to 6% by weight of an acid-activated natural clay, e. g., the product sold commercially as Superfiltrol. The clay catalyst may then be separated from the oil by filtration and the resin product recovered from the polymerized oil by distillation.

The sulfuric acid polymerization is preferably carried out by finely dispersing 1% to 2% by weight, based on the weight of the oil, of aqueous sulfuric acid, e. g., 66° Bé. acid, at 0° to 10° C., whereupon the polymerizable constituents in the oil undergo polymerization. The acid catalyst may thereafter be separated by settling or centrifuging, the oil neutralized and washed, and the resin recovered by the usual distillation procedure.

The new resin product made by the preferred process of my invention as above described contains at least 70%, generally 70% to 85%, polymerized indene, the remainder consisting predominantly of polymerized styrene homologs; generally, at least 15% of the resin consists of polymerized homologs of styrene, and at least 95% of the resin consists of polymerized indene and polymerized homologs of styrene together. Since the resin consists largely of polymerized indene, it has been referred to in the specification as an indene-type resin.

The reason for the remarkable improvement in the catalytically polymerized resin produced after the preliminary partial heat polymer has been formed and separated, is not fully understood. It appears probable that at least some of the styrene homologs in the resin oil, e. g., para-methyl styrene (as well as styrene, if present), are preferentially polymerized by the heat treatment since the heat polymerized resin obtained from a resin oil in which the polymerizables were essentially indene and homologs of styrene, has been found to consist predominantly of styrene homolog polymers. The heat polymerization treatment thus alters the ratio of indene to other constituents, both polymerizable and unpolymerizable constituents, in the unpolymerized portion of the oil, which may, in part, account for the fact that a new resin product may be produced by subsequent catalytic polymerization. My invention is not to be limited, however, by any explanation of the mechanism of the process. Whatever the reason, the fact is that a preliminary heat polymerization treatment as above described makes possible the subsequent production of a catalytically polymerized resin of surprisingly improved properties; moreover, the preliminary heat polymerized product is in itself a superior resin, as indicated in my co-pending application.

The following example is illustrative of the process and product of my invention:

*Example.*—A crude "Hi-Flash" fraction of drip oil of boiling range 155° to 205° C. was employed. Polymerizable constituents constituted 50% of the crude, and 60% of the polymerizable constituents consisted of indene. The remaining 40% consisted primarily of styrene homologs.

5,000 gallons of crude were refluxed at 175° C. for sixteen hours. During the early part of the treatment 250 gallons of the more volatile constituents of the oil, containing color-forming bodies, were removed by fractionation. At the end of the refluxing period 40% of the resin-forming constituents had been resinified. The oil was distilled to separate unpolymerized material from the heat polymerized resin by means of vacuum and live steam while maintaining the still temperature below 190° C. The proportion of indene in the separated unpolymerized oil amounted to 75% of the available resin-forming constituents.

The oil was diluted to a concentration of 25% polymerizables with part-refined "Hi-Flash" (a drip oil "Hi-Flash" naphtha fraction from which polymerizable constituents had been substantially removed) and then polymerized at 0° to 10° C. by finely dispersing in the oil concentrated sulfuric acid (66° Bé.). After polymerization the sulfuric acid was separated by centrifuging, and the oil was washed with aqueous caustic and with water. The catalytically polymerized resin product was recovered from the oil by the usual distillation procedure. The resin had the following properties:

| | |
|---|---|
| Color | C-2 |
| Melting point | °C.. 135 |
| Cloud from rapeseed oil | °C.. −20 |
| Cloud from Stoddard solvent | °C.. −5 |
| Blend with stearin pitch (60 parts resin, 40 parts pitch) | Homogeneous. |
| Character of blended product | Bright, sharp fracture. |
| Hardness of blended product | Indentatoin of .08 inch in ten minutes when tested at 77° F. with McBurney-Bowen indentation tester using one-quarter inch point. |

As a basis for comparison, the same crude was subjected to sulfuric acid polymerization as above described without the preliminary heat polymerization treatment. The resulting resin had the following characteristics:

| | |
|---|---|
| Color | C-7 |
| Melting point | °C.. 118 |
| Cloud from rapeseed oil | °C.. −20 |
| Cloud from Stoddard solvent | °C.. −20 |
| Blend with stearin pitch | Homogeneous. |
| Character of blended product | Bright, sharp fracture. |
| Hardness of blended product | Indentation of 0.250 inch in one minute when tested at 77° F. with McBurney-Bowen indentation tester using one-quarter inch point |

Because of the unusual combination of properties possessed by my new resin product, namely, good color, relatively high melting point and high degree of hardness, particularly when blended with stearin pitch, on the one hand, and high compatibility with stearin pitch as well as with vegetable and mineral oils, on the other hand, this resin is particularly advantageous for production of materials of construction, such as mastic tile used for flooring and similar uses, as well as for the production of various coating materials where solubility in vegetable or mineral oils is essential and where it is desired that the coating should possess a high degree of hardness or durability.

The resin oils to which my process is applicable are referred to in the specification and claims as indene-styrene homolog resin oils, and this term is intended to include resin oils from any source in which indene and homologs of styrene are both present in substantial proportions in the oil.

Since certain changes in carrying out the above process and certain modifications in the composition which embody the invention may be made without departing from its scope, it is intended that all matter contained in the above description shall be interpreted as illustrative and not in a limiting sense.

I claim:

1. A process which comprises heating an indene-styrene homolog fraction derived by fractional distillation of a resin oil from a natural source, in which fraction indene comprises about 25% to 80% of the polymerizable constituents, styrene homologs comprise about 20% to 75% of the polymerizable constituents, and indene and homologs of styrene together comprise at least 80% of the polymerizable constituents, to effect partial heat polymerization of polymerizable constituents in the fraction until the unpolymerized indene content of the fraction rises to about 70% to 85% of the polymerizable bodies which have not undergone polymerization, distilling the partially polymerized fraction to separate as residue the heat polymer thus formed, and subjecting the distillate oil containing polymerizable bodies to catalytic polymerization with a clay catalyst.

2. A process which comprises heating an indene-styrene homolog fraction derived by fractional distillation of a resin oil from a natural source, in which fraction indene comprises about 25% to 80% of the polymerizable constituents, styrene homologs comprise about 20% to 75% of the polymerizable constituents, and indene and homologs of styrene together comprise at least 80% of the polymerizable constituents, to effect partial heat polymerization of polymerizable constituents in the fraction until the unpolymerized indene content of the fraction rises to about 70% to 85% of the polymerizable bodies which have not undergone polymerization, distilling the partially polymerized fraction to separate as residue the heat polymer thus formed, and subjecting the distillate oil containing polymerizable bodies to catalytic polymerization with an aqueous sulfuric acid catalyst.

3. A process for the production of two resin products from an indene-styrene homolog fraction derived by fractional distillation of a resin oil from a natural source, in which fraction indene comprises from about 25% to 80% of the polymerizable constituents, styrene homologs comprise about 20% to 75% of the polymerizable constituents, and indene and homologs of styrene together comprise at least 80% of the polymerizable constituents, which process comprises heating the fraction at a temperature of 150° to 200° C. to bring about partial heat polymerization of polymerizable constituents until the unpolymerized indene content of the fraction rises to about 70% to 85% of the polymerizable bodies which have not undergone polymerization, distilling the partially polymerized oil to separate as residue the heat polymer thus formed, and subjecting the distillate oil from which the heat polymer has been separated to catalytic polymerization at about 0° to 10° C. with a concentrated aqueous solution of sulfuric acid as catalyst.

4. A process for the production of two resin products from an indene-styrene homolog fraction derived by fractional distillation of a resin oil from a natural source, in which fraction indene comprises from about 25% to 80% of the polymerizable constituents, styrene homologs comprise about 20% to 75% of the polymerizable constituents, and indene and homologs of styrene together comprise at least 80% of the polymerizable constituents, which process comprises heating the fraction at a temperature of 150° to 200° C. to bring about partial heat polymerization of polymerizable constituents until the unpolymerized indene content of the fraction rises to about 70% to 85% of the polymerizable bodies which have not undergone polymerization, distilling the partially polymerized oil to separate as residue the heat polymer thus formed, and subjecting the distillate oil from which the heat polymer has been separated to catalytic polymerization at about 90° to 100° C. with an acid activated clay as catalyst.

5. A process for production of two resin products from an indene-styrene homolog oil in which indene comprises about 25% to 80% of the polymerizable constituents, styrene homologs comprise about 20% to 75% of the polymerizable constituents, and indene and homologs of styrene together comprise at least 80% of the polymerizable constituents, which process comprises heating the oil at a temperature effective to polymerize indene and homologs of styrene by action of heat alone to bring about partial heat polymerization of polymerizable constituents of the oil until the unpolymerized indene content of the oil rises to about 70% to 85% of the polymerizable bodies which have not undergone polymerization, distilling the partially polymerized oil to separate as residue the heat polymer thus formed and subjecting the distillate oil from which the heat polymer has been separated to catalytic polymerization with a concentrated aqueous solution of sulfuric acid as catalyst at a temperature effective to polymerize indene and homologs of styrene by action of the sulfuric acid catalyst.

6. A process for production of two resin products from an indene-styrene homolog oil in which indene comprises about 25% to 80% of the polymerizable constituents, styrene homologs comprise about 20% to 75% of the polymerizable constituents, and indene and homologs of styrene together comprise at least 80% of the polymerizable constituents, which process comprises heating the oil at a temperature effective to polymerize indene and homologs of styrene by action of heat alone to bring about partial heat polymerization of polymerizable constituents of the oil until the unpolymerized indene content of the oil rises to about 70% to 85% of the polymerizable bodies which have not undergone polymerization, distilling the partially polymerized oil to separate as residue the heat polymer thus formed and subjecting the distillate oil from which the heat polymer has been separated to catalytic polymerization with an acid activated clay as catalyst at a temperature effective to polymerize indene and homologs of styrene by action of the clay catalyst.

7. A process for production of a resin product from an indene-styrene homolog oil in which indene comprises about 25% to 80% of the polymerizable constituents, styrene homologs comprise about 20% to 75% of the polymerizable constituents, and indene and homologs of styrene together comprise about 80% of the polymerizable constituents, which process comprises heating the oil at a temperature effective to polymerize indene and homologs of styrene by action of heat alone to bring about partial heat polymerization of polymerizable constituents of the oil until the unpolymerized indene content of the oil rises to about 70% to 85% of the polymerizable bodies which have not undergone polymerization, distilling the partially polymerized oil to separate as residue the heat polymer thus formed, and treating the distillate oil from which the heat polymer has been separated with a resin-producing catalyst to form catalytic resin polymer.

8. A process which comprises distilling an indene-styrene homolog resin oil to separate substantially all constituents boiling below about 150° C. and thus produce a resin oil in which indene comprises about 25% to 80% of the polymerizable constituents, styrene homologs comprise about 20% to 75% of the polymerizable constituents, and indene and homologs of styrene together comprise at least 80% of the polymerizable constituents, heating the resulting oil at a temperature effective to polymerize indene and homologs of styrene by action of heat alone to bring about partial heat polymerization of polymerizable constituents of the oil until the unpolymerized indene content of the oil rises to about 70% to 85% of the polymerizable bodies which have not undergone polymerization, distilling the partially polymerized oil at a temperature below about 190° C. to separate as residue the heat polymer thus formed, and treating the distillate oil from which the heat polymer has been separated with a resin-producing catalyst to form catalytic resin polymer.

9. A process for production of a resin product from an indene-styrene homolog oil in which indene comprises about 40% to 60% of the polymerizable constituents and styrene homologs comprise about 40% to 60% of the polymerizable constituents, which process comprises heating the oil at a temperature effective to polymerize indene and homologs of styrene by action of heat alone to bring about partial heat polymerization of polymerizable constituents of the oil until the unpolymerized indene content of the oil rises to about 75% to 80% of the polymerizable bodies which have not undergone polymerization, distilling the partially polymerized oil at a temperature below about 190° C. to separate as residue the heat polymer thus formed, and treating the distillate oil from which the heat polymer has been separated with a resin-producing catalyst to form catalytic resin polymer.

EDWIN LOUIS CLINE.